(12) United States Patent
Ma

(10) Patent No.: US 7,953,195 B2
(45) Date of Patent: May 31, 2011

(54) SYSTEM AND METHOD FOR DIGITIZING BIT SYNCHRONIZATION IN WIRELESS COMMUNICATION

(75) Inventor: Chao Ma, Shenzhen (CN)

(73) Assignee: Shenzhen HYT Science & Technology Co., Ltd., Nanshan District, Shenzhen (CN)

( * ) Notice: Subject to any disclaimer, the term of this patent is extended or adjusted under 35 U.S.C. 154(b) by 1083 days.

(21) Appl. No.: 11/734,510

(22) Filed: Apr. 12, 2007

(65) Prior Publication Data

US 2008/0130808 A1    Jun. 5, 2008

(30) Foreign Application Priority Data

Dec. 4, 2006    (CN) .......................... 2006 1 0157323

(51) Int. Cl.
*H04L 7/00* (2006.01)
*H04L 27/06* (2006.01)
(52) U.S. Cl. ...................................... 375/354; 375/341
(58) Field of Classification Search .................. 375/354, 375/259, 260, 261, 262, 316, 340, 341, 343; 708/100, 200, 444, 445, 490, 800, 801, 805
See application file for complete search history.

(56) References Cited

U.S. PATENT DOCUMENTS

| | | | | |
|---|---|---|---|---|
| 5,625,641 A * | 4/1997 | Takakusaki | .................. | 375/137 |
| 7,672,358 B2 * | 3/2010 | Abraham et al. | ............. | 375/142 |
| 2005/0074078 A1 * | 4/2005 | Pawlowski et al. | ........... | 375/341 |

* cited by examiner

*Primary Examiner* — David C. Payne
*Assistant Examiner* — Vineeta S Panwalkar
(74) *Attorney, Agent, or Firm* — Global IP Services; Tianhua Gu

(57) ABSTRACT

This invention relates to a method and system for digitizing bit synchronization in wireless communication. The method comprises delaying at intervals an input signal sequence, which contains at least one path of input signals; multiplying each path of input signals respectively by input signals in at least one local channel within one symbol period, the results are accumulated and then averaged within the symbol period; comparing absolute values of the averaged values of each channel of each path of input signals, and choosing a maximum absolute value to output as a bit synchronization extremum of the path; comparing the bit synchronization extremums of each path of input signals, and choosing a path of input signals having a maximum extremum as a decoded data output. This invention utilizes DMR bit synchronization technology that facilitates digitalization and reduces calculation, thereby greatly increase data rate, save resources and reduce costs.

18 Claims, 10 Drawing Sheets

SYSTEM AND METHOD FOR DIGITIZING BIT SYNCHRONIZATION IN WIRELESS COMMUNICATION

CROSS REFERENCE TO THE RELATED PATENT APPLICATION

This patent application claims the priority of the Chinese patent application No. 200610157323.7, filing date Dec. 4, 2006.

TECHNICAL FIELD OF THE INVENTION

This invention relates to a bit synchronization technology in wireless communication field, and more particularly to a system and method for digitizing bit synchronization in wireless communication, which may be applied to a professional wireless communication field of DMR (Digital Mobile Radio) and all communication products with CPFSK (Continuous Phase Frequency Shift Keying) modulation.

BACKGROUND OF THE INVENTION

It is most difficult for any wireless communication product to achieve bit synchronization. In consideration of digital signal being a string of consecutive code sequence and the existence of noise and inter-symbol interference, in order to get a more reliable decision and reduce bit error rate of a system, the related demodulated baseband signal should be voted at a optimal sampling time of each code element period (i.e. when a eye pattern opens to its limit) to recover an orderly and regular signal code flow. Because of a signal transmission delay, such a time is often unknown and needs to be obtained by timed recovery of bit synchronization. Therefore the timed recovery of bit synchronization is crucial for decoding accuracy.

A most frequently used bit synchronization technology is Maximum Likelihood Estimate, which is a synchronization technology based on Fast Fourier Transform (FFT) algorithm, and is called Late/Early Gate bit synchronization technology. Theoretically, the Maximum Likelihood Estimate could be optimized, but the calculation is the most complicated, and is not suitable for digitization. The FFT algorithm is mainly used in communication system of OFDM (orthogonal frequency division multiplexing), which must process a received signal with some non-linear operations to obtain a desired timing line spectrum. For example, in a conventional non-data-aided timing recovery system, after non-linear processing is applied to the received signals, clock signals are extracted via a narrow band bandpass filter or a PLL (phase locked loop). Such a method is also called Tone filtering with complicated calculation. Currently the Late/Early Gate technology is mainly applied to communication systems with PSK (phase shift keying) and QPSK (quadrature phase shift keying) modulation.

The DMR is a new standard for professional digital communication newly released by ETSI (European Telecommunication Standards Institute). Considering that no DMR product has been released in China, this invention, aiming at a research and development of DMR products, provides a DMR bit synchronization technology that facilitates realization of digitization and reduces calculation.

CONTENTS OF THE INVENTION

The invention provides the system and method for digitizing bit synchronization in wireless communication, to solve the limitations and disadvantages of conventional and traditional approaches.

A technical solution to solving the problems is to create an approach to digitizing bit synchronization. And said approach contains the following steps:

delaying at intervals an input signal sequence which contains more than one path of input signals;

multiplying each path of input signals respectively by input signals in more than one local channel within one symbol period, the results are accumulated and then averaged within the symbol period;

comparing absolute values of the averaged values of each channel of input signals of each path, and choosing a maximum value to output as a bit synchronization extremum of the path;

comparing the bit synchronization extremums of each path, and choosing a path with the maximum extremum as a decoded data output.

The approach further contains splitting output of a crystal oscillator to generate several clocks necessary for the bit synchronization algorithm.

Advantageously, when four paths of complex signals are utilized as input, then the interval delays of the signal sequence are set as below: the first path of said four paths of complex signals is of data stream without delay, the second path is delayed for two symbol periods, the third path is delayed for four symbol periods, and the fourth path is delayed for 6 symbol periods, thus parallel synchronized input source is converted into serial input source.

Advantageously, the approach further comprises the following steps of simplifying a synchronization frequency point according to symmetry of modulation level:

generating an inquiry address of sine/cosine amplitude, and read a sine/cosine amplitude value in a memory unit;

outputting the sine/cosine amplitude value in the memory unit.

Advantageously, the input signal sequence is in the form of complex signals, and the complex signals may be converted into a mathematical formula of multiplying path I by path Q as following:

$$e^{j(w_0+w_\theta+nw_ct)}e^{jw_ct} = (\cos(w_0+w_\theta+nw_ct)+j\sin(w_0+w_\theta+nw_ct))(\cos(w_ct)+j\sin(w_ct))$$
$$= \cos(w_0+w_\theta+nw_ct)\cos(w_ct) -$$
$$\sin(w_0+w_\theta+nw_ct)\sin(w_ct) +$$
$$j(\sin(w_0+w_\theta+nw_ct)\cos(w_ct) +$$
$$\cos(w_0+w_\theta+nw_ct)\sin(w_ct))$$

wherein
$\cos(w_0+w_\theta+nw_ct)$ is data to be decoded in path I;
$\sin(w_0+w_\theta+nw_ct)$ is data to be decoded in path Q;
$e^{jw_ct}$ is output of a decoded frequency point generating module when the modulation level is +1;
wherein when the modulation level is −1, the result is:

$\cos(w_0+w_\theta+nw_ct)\cos(w_ct)+\sin(w_0+w_\theta+nw_ct)\sin(w_ct)+$
$j(\sin(w_0+w_\theta+nw_ct)\cos(w_ct)\cos(w_0+w_\theta+nw_ct)\sin(w_ct))$.

Advantageously, the step of multiplying each path of input signals respectively by input signals in more than one local channel within one symbol period further comprises:

inputting the sine/cosine amplitude value, the data streams of path I and Q into at least a multiplier, a clipper, an adder and a subtracter for calculation;

outputting the calculation result as a real part and a false part of the complex multiplication of the modulation level.

According to another aspect of the invention, a system for digitizing bit synchronization in wireless communication is provided, the system contains:

A clock control module used to split output of a crystal oscillator to generate several clocks necessary for a bit synchronization algorithm;

A data delay module used to delay input data;

A bit synchronization frequency generating module used to simplify a synchronization frequency point according to symmetry of a modulation level;

A complex multiplication module used to multiply the input complex signal by simplified synchronization frequency point from the bit synchronization frequency generating module;

An accumulation module used to accumulate the multiplied data within a data period;

An averaging module used to average the accumulated data;

A selection module used to compare and choose the averaged data and output a decoded data and its corresponding maximum value.

Advantageously, the system further comprises:

A parallel-to-serial conversion module used to convert a parallel synchronized input source that needs to be averaged into a serial input source;

A serial-to-parallel conversion module used to convert the averaged serial synchronized input source into a parallel input source and input the parallel input source into the selection module for comparison.

Advantageously, the bit synchronization frequency module further comprises:

A generating module used to generate a inquiry address of sine/cosine amplitude and read the sine/cosine amplitude value in a memory unit;

wherein the memory unit is used to store and output a sine/cosine amplitude value.

Advantageously, the complex multiplication module further comprises at least a multiplier, a clipper used to low clip the bit width of input data, an adder and a subtracter.

The system and method for digitizing bit synchronization in wireless communication utilize DMR bit synchronization technology that facilitates digitalization and reduces calculation, to greatly increase data rate, save resources and reduce costs.

DETAILED DESCRIPTION OF THE INVENTION

Figure 1:
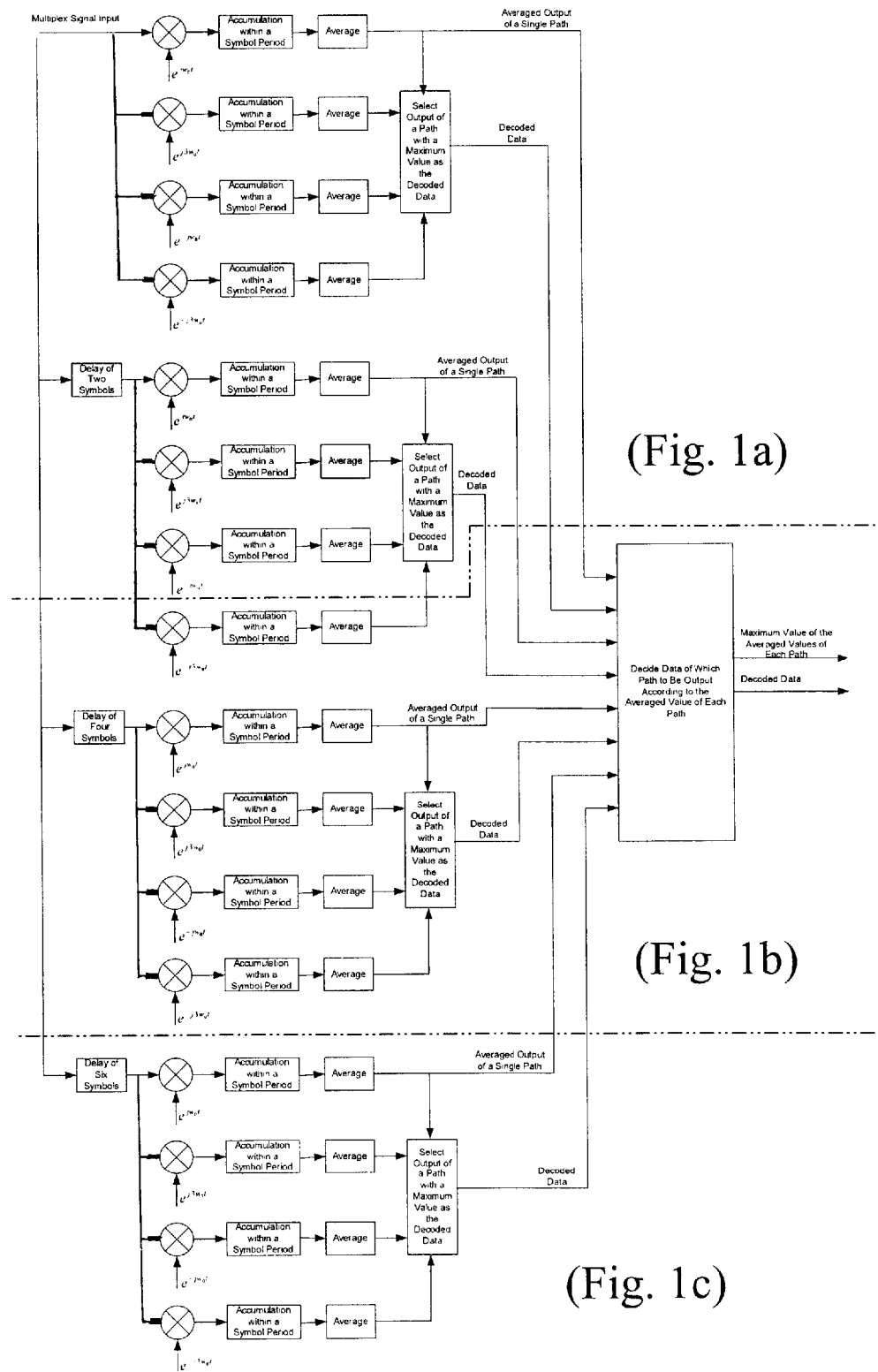
FIG. 1 is a block diagram representation of bit synchronization of DMR communication system in accordance with an embodiment of the present invention.
Figure 1A:
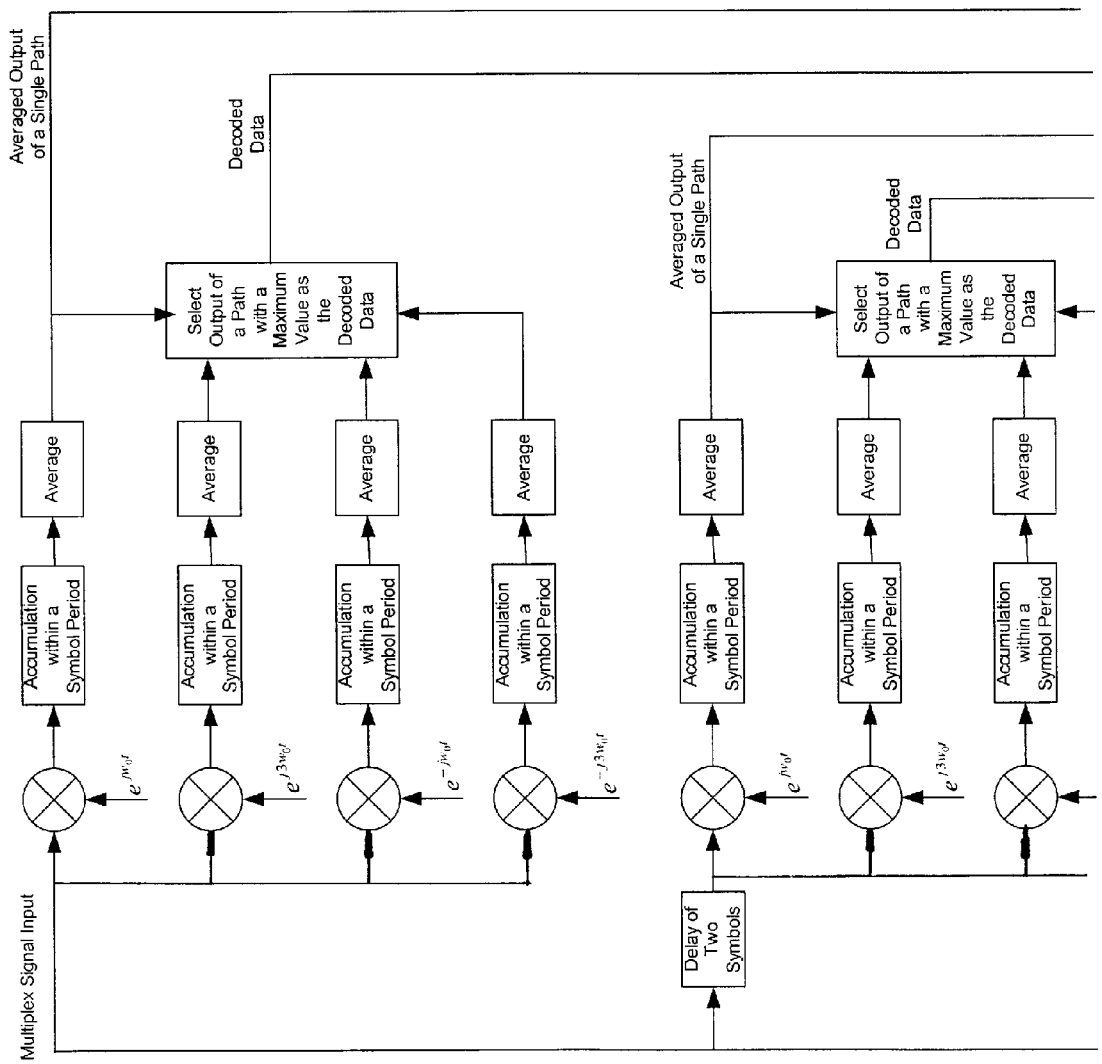
Figure 1B:
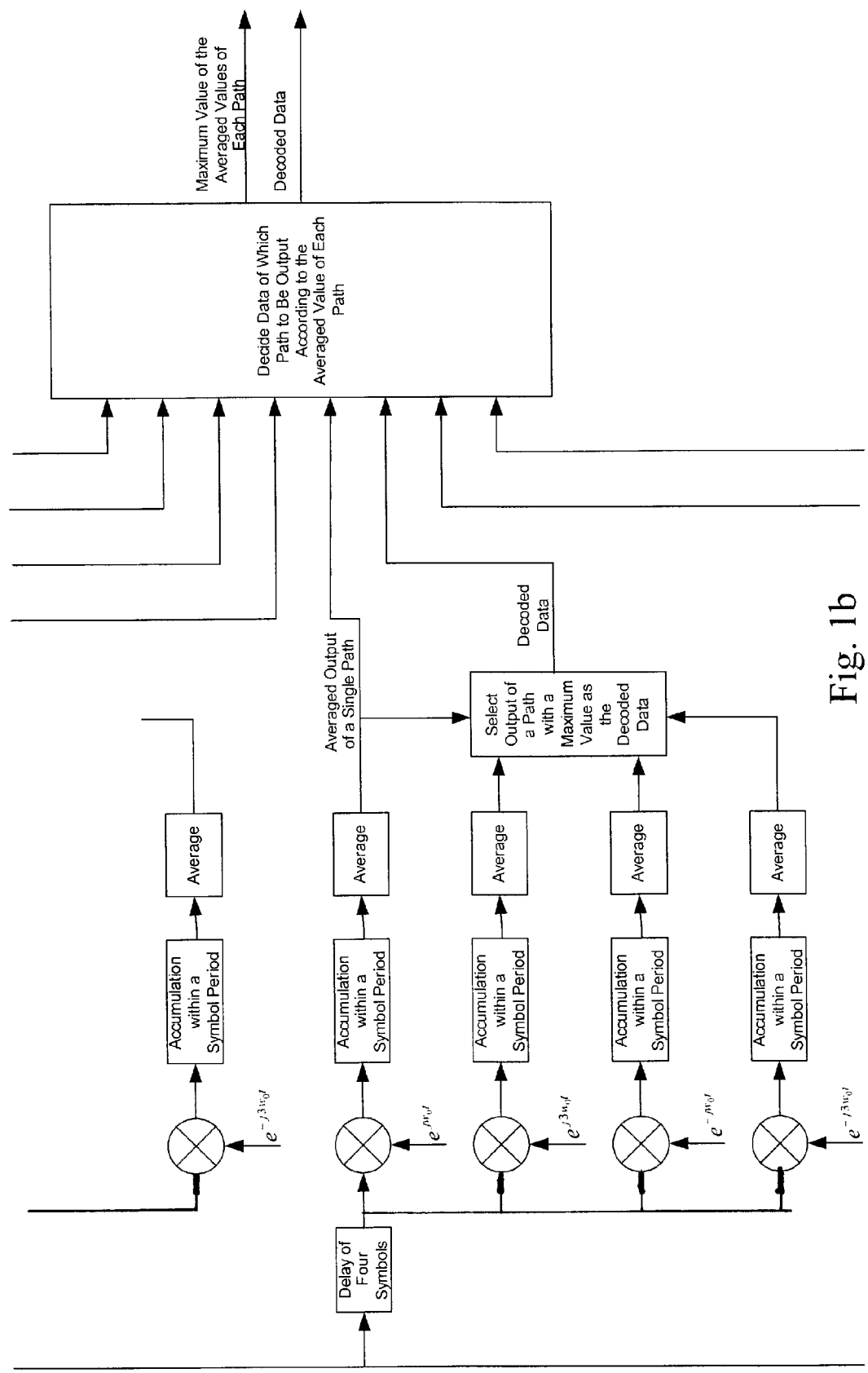
Figure 1C:
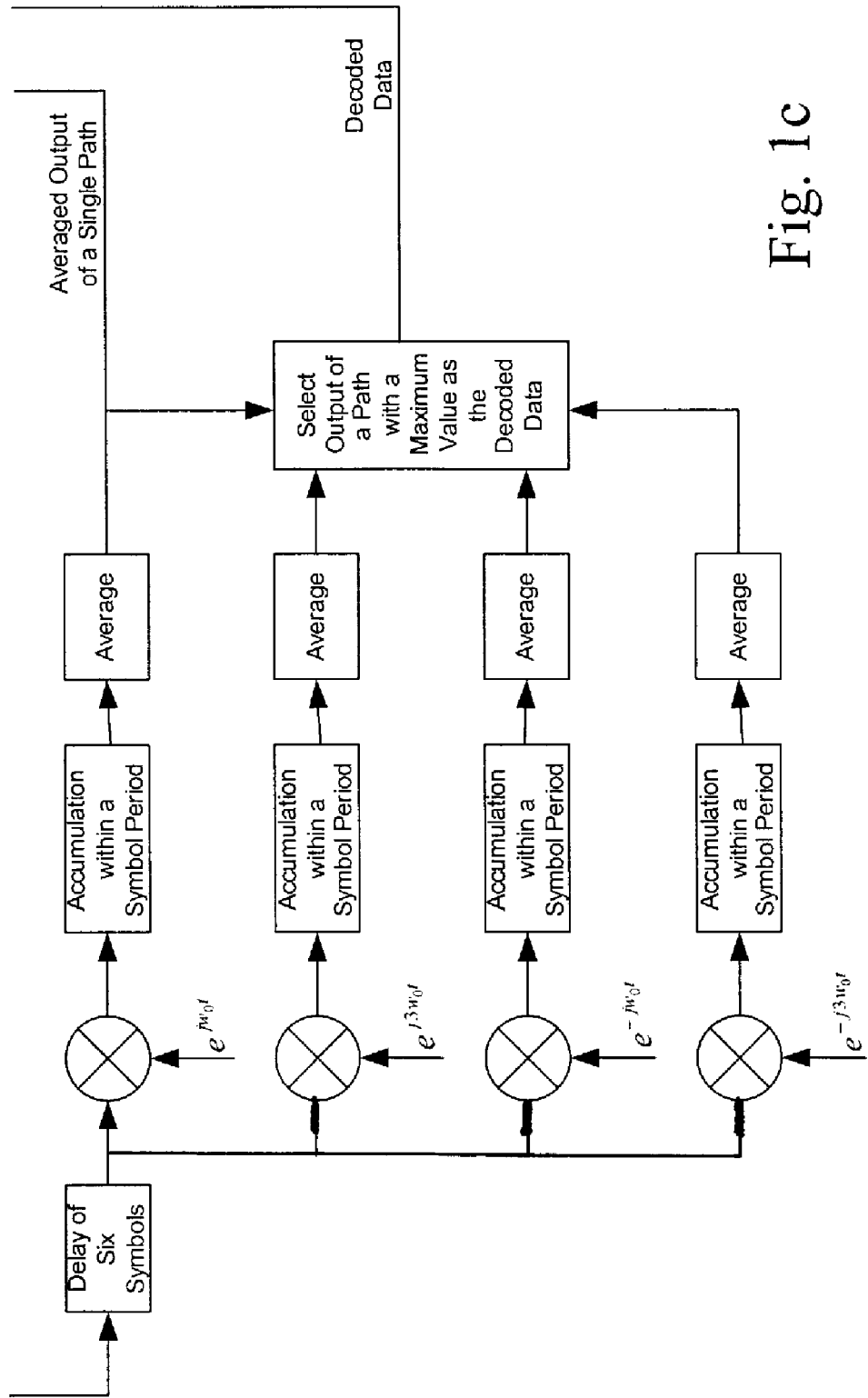

As shown in FIG. 1, a method for digitizing bit synchronization in wireless communication comprises the following steps:

delaying at intervals an input signal sequence, which contains more than one path of input signals;

multiplying each path of input signals respectively by input signals in more than one local channel within one symbol period, the results are accumulated and then averaged within the symbol period;

comparing absolute values of the averaged values of each channel of each path of input signals, and choosing a maximum absolute value to output as a bit synchronization extremum of the path of input signals;

comparing the bit synchronization extremums of each path of input signals, and choosing a path of input signals having a maximum extremum as a decoded data output.

As shown in the figure, the structure of bit synchronization described in the invention is repetitive. FIG. 1 is a preferred embodiment utilizing four paths of symbol signal input. The first path of complex signal input has no delay; a delay of the second path is 2 symbol periods; a delay of the third path is 4 symbol periods, and a delay of the fourth path is 6 symbol periods. The symbol period refers to data rate. Code rate specified by the DMR standards is 9.6K and the symbol rate is 4.8K.

Input signals of each path are multiplied respectively by local signals from four channels in a symbol period. The output multiplied values are accumulated and averaged within the symbol period. Then the absolute values of the averaged values corresponding to the four channels are compared to choose a channel having a maximum absolute value, extremum data of which are chosen as an output of the path. Then the decoded date of the maximum absolute value output by each path is compared with that of the other three paths and is output on the path with a maximum value.

In consideration of the repetition of the structure, the calculation of the four paths is completed via sequential control to a path during the realization of FPGA. This will save about 70% resource and save the cost. Detailed description is given below in combination of a system for digitizing bit synchronization in wireless communication of the invention.

Figure 2:
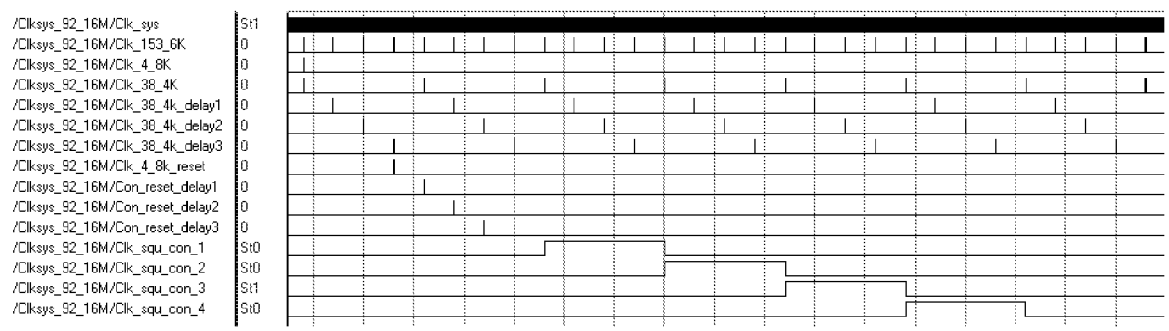
FIG. 2 is a time sequence diagram of clock frequency division in accordance with an embodiment of the present invention.

A clock frequency division generated by the clock control module is shown in FIG. 2. In consideration of the repetition of the bit synchronization structure, operation clock may be increased four times to save the resources during the realization of FPGA. Therefore a well-defined time sequence relationship is needed. The clock control module splits crystal oscillator to generate several clocks necessary for the bit synchronization algorithm. Table 1 shows a exemplary definition of the clocks.

TABLE 1

Definition of Clock in the Time Sequence Module

| Name of Clock | Value of Frequency Division Clock | Description |
| --- | --- | --- |
| Clk_sys | 4.9152M | FPGA internal system clock |
| Clk_153_6K | 153.6K | Multiplex control clock |

TABLE 1-continued

Definition of Clock in the Time Sequence Module

| Name of Clock | Value of Frequency Division Clock | Description |
|---|---|---|
| Clk_4_8K | 4.8K | Symbol clock |
| Clk_38_4K | 38.4K | Symbol upsampling clock, for path 1 of bit synchronization |
| Clk_38_4k_delay1 | 38.4K | Symbol upsampling clock, for path 2 of bit synchronization |
| Clk_38_4k_delay2 | 38.4K | Symbol upsampling clock, for path 2 of bit synchronization |
| Clk_38_4k_delay3 | 38.4K | Symbol upsampling clock, for path 4 of bit synchronization |
| Clk_4_8k_reset | 4.8k | Reset clock, used to reset the accumulation module of path 1 |
| Con_reset_delay1 | 4.8k | Reset clock, used to reset the accumulation module of path 2 |
| Con_reset_delay2 | 4.8k | Reset clock, used to reset the accumulation module of path 3 |
| Con_reset_delay3 | 4.8k | Reset clock, used to reset the accumulation module of path 4 |
| Clk_squ_con_1 | 4.8k | Square enabling clock, for square calculation of path 1 at high level |
| Clk_squ_con_2 | 4.8k | Square enabling clock, for square calculation of path 2 at high level |
| Clk_squ_con_3 | 4.8k | Square enabling clock, for square calculation of path 3 at high level |
| Clk_squ_con_4 | 4.8k | Square enabling clock, for square calculation of path 4 at high level |

Figure 3:
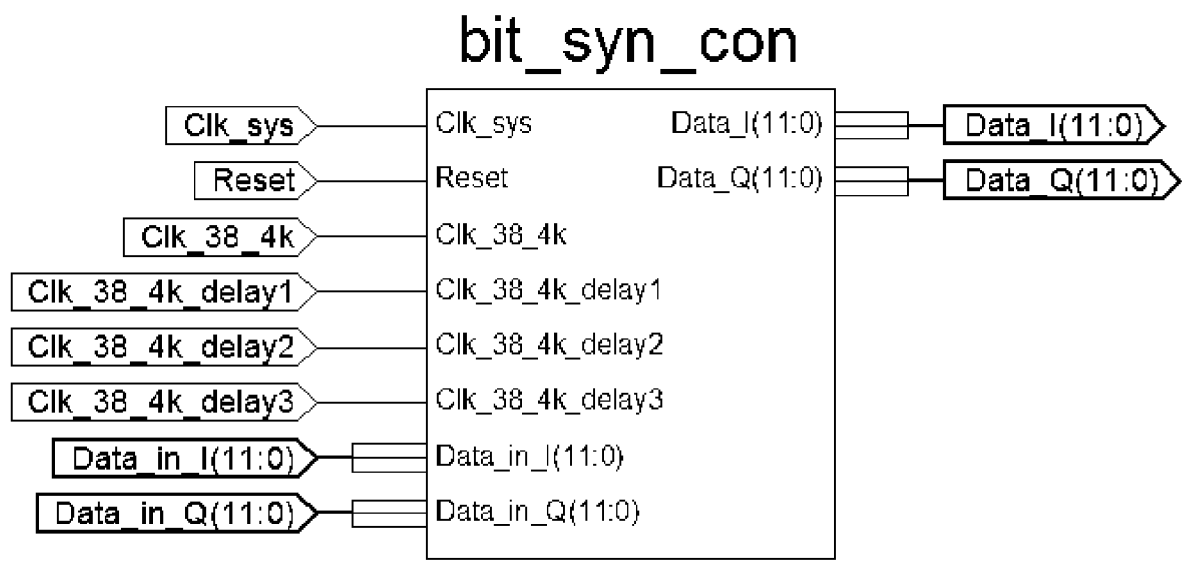
FIG. 3 is a structural diagram of FPGA of a data delay module in accordance with an embodiment of the present invention.

A structural diagram of the FPGA of the data delay module is shown in FIG. 3. As illustrated by the structure of bit synchronization, the input data has to be delayed under four conditions. The bit_syn_con module raises the input data rate from 38.4K to 153.6K, which causes output of four 12-bit data within a period during which a single 12-bit data is previously input. The four data are data stream without delay, data stream with delay of two 38.4K clocks, data stream with delay of four 38.4K clocks and data stream with delay of six 38.4K clocks. Accordingly, the parallel synchronization input source could be converted into a serial input source. Table 2 shows an exemplary pin definition.

TABLE 2

Pin Definition of the Decoded Frequency Point Generating Module

| Signal Name | I/O | Description |
|---|---|---|
| Clk_sys | IN | FPGA internal system clock |
| Reset | IN | Reset signal |
| Clk_38_4K | IN | Control output of the data stream without delay |
| Clk_38_4k_delay1 | IN | Control output of the data stream with delay of two sampling clocks |
| Clk_38_4k_delay2 | IN | Control output of the data stream with delay of four sampling clocks |
| Clk_38_4k_delay3 | IN | Control output of the data stream with delay of six sampling clocks |
| Data_in_I | IN | Input of the data stream in path I |
| Data_in_Q | IN | Input of the data stream in path Q |
| Data_I | OUT | Output of the data stream in path I, wherein the data rate is quadrupled |
| Data_I | OUT | Output of the data stream in path Q, wherein the data rate is quadrupled |

Figure 4:
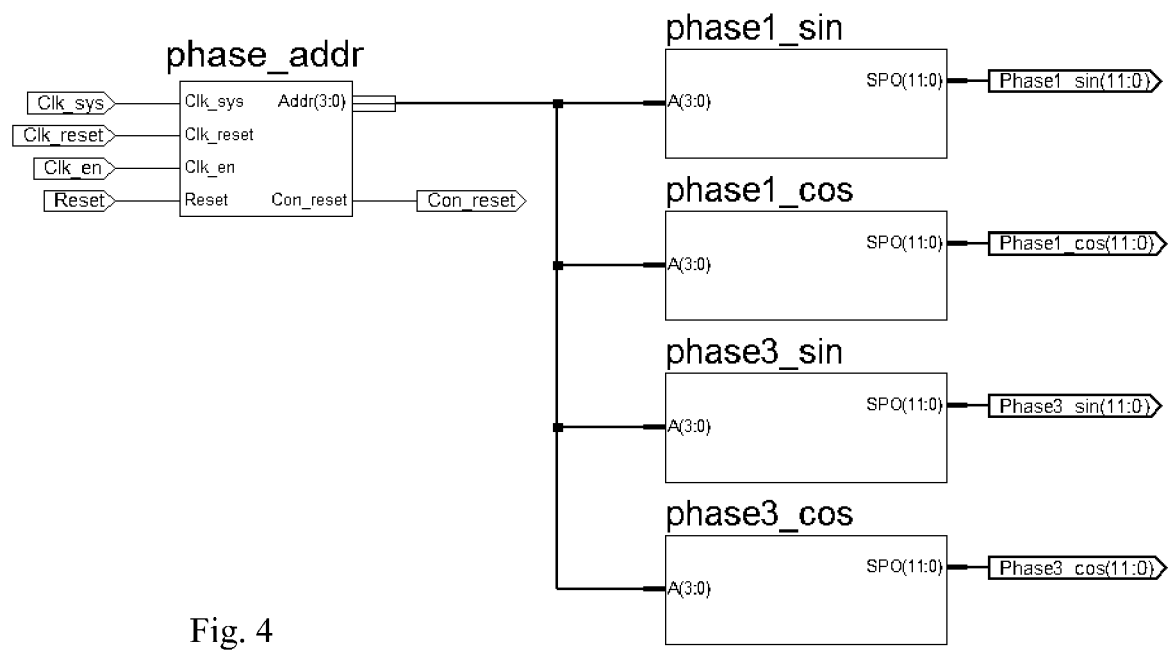
FIG. 4 is a structural diagram of FPGA of a synchronization frequency point generating module in accordance with an embodiment of the present invention.

A structural diagram of the realization of FPGA of the frequency point generating module for bit synchronization is shown in FIG. 4. In consideration of the symmetry of the modulation level, four frequency point generating modules shown in FIG. 4 may be simplified into two modules to save resources and costs when FPGA is used to realize the modules. Phase_addr module is used to generate an inquiry address for sine-cosine amplitude to read sine-cosine amplitude values stored in four ROM memory units. Phase1_sin module is used to store a sine amplitude output when the modulation level is +1, while phase1_cos module is used to store a cosine amplitude output when the modulation level is +1. The other two modules are respectively used to store a sine and cosine amplitude output when the modulation level is +3. Table 3 shows an exemplary pin definition in such a case.

TABLE 3

Pin Definition of the Frequency Generating Module for Bit Synchronization

| Signal Name | I/O | Description |
|---|---|---|
| Clk_sys | IN | FPGA internal 614.4K system clock |
| Reset | IN | Reset signal |
| Clk_en | IN | Enabling clock, 38.4K |
| Con_reset | OUT | Control the accumulation reset signal |
| Phase1_sin | OUT | Output of sine amplitude when the modulation level is +1 |
| Phase1_cos | OUT | Output of cosine amplitude when the modulation level is +1 |
| Phase3_sin | OUT | Output of sine amplitude when the modulation level is +3 |
| Phase3_cos | OUT | Output of cosine amplitude when the modulation level is +3 |

In FIG. 1, the input signals I and Q are in the form of complex number and complexly multiplied by the local decoded frequency point generating module. However, when implemented with FPGA, the complex number should be firstly converted into a normal mathematical expression of multiplication of path I and Q, that is:

$$e^{j(w_0+w_\theta+nw_ct)}e^{jw_ct} = (\cos(w_0+w_\theta+nw_ct)+j\sin(w_0+w_\theta+nw_ct))(\cos(w_ct)+j\sin(w_ct))$$
$$= \cos(w_0+w_\theta+nw_ct)\cos(w_ct) - \sin(w_0+w_\theta+nw_ct)\sin(w_ct) + j(\sin(w_0+w_\theta+nw_ct)\cos(w_ct) + \cos(w_0+w_\theta+nw_ct)\sin(w_ct))$$

wherein
$\cos(w_0+w_\theta+nw_ct)$ is data to be decoded in path I;
$\sin(w_0+w_\theta+nw_ct)$ is data to be decoded in path Q;
$e^{jw_ct}$ is output of a decoded frequency point generating module when the modulation level is +1.

When the modulation level is −1, the result of the expression is:

$$\cos(w_0+w_\theta+nw_ct)\cos(w_ct)+\sin(w_0+w_\theta+nw_ct)\sin(w_ct)+j(\sin(w_0+w_\theta+nw_ct)\cos(w_ct)\cos(w_0+w_\theta+nw_ct)\sin(w_ct)).$$

Figure 5:
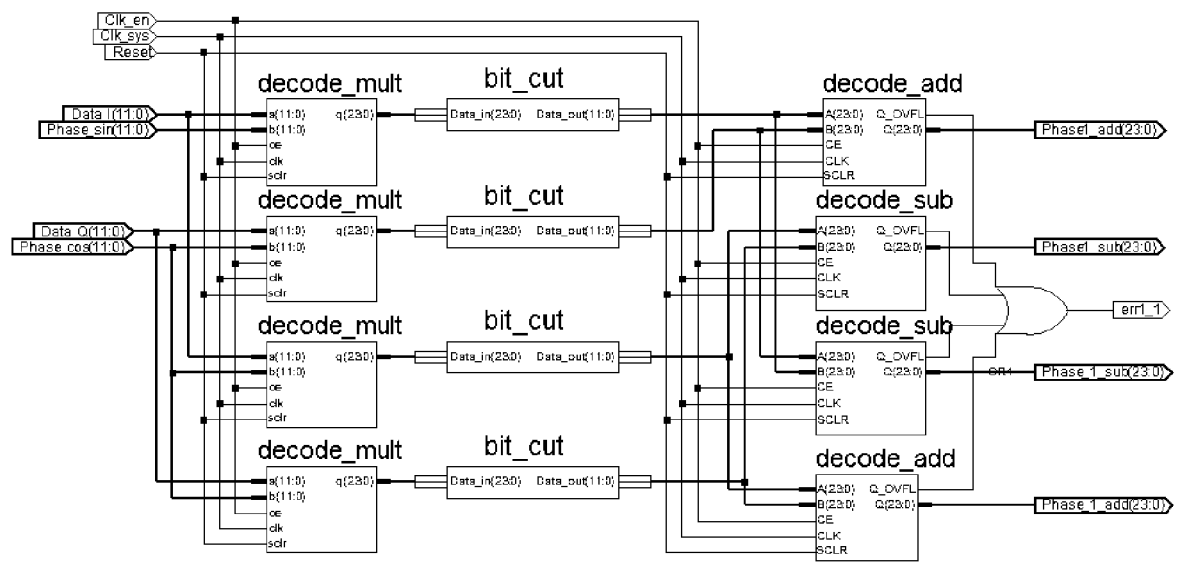
FIG. 5 is a structural diagram of FPGA of a complex multiplication module having two channels in accordance with an embodiment of the present invention.
Figure 6:
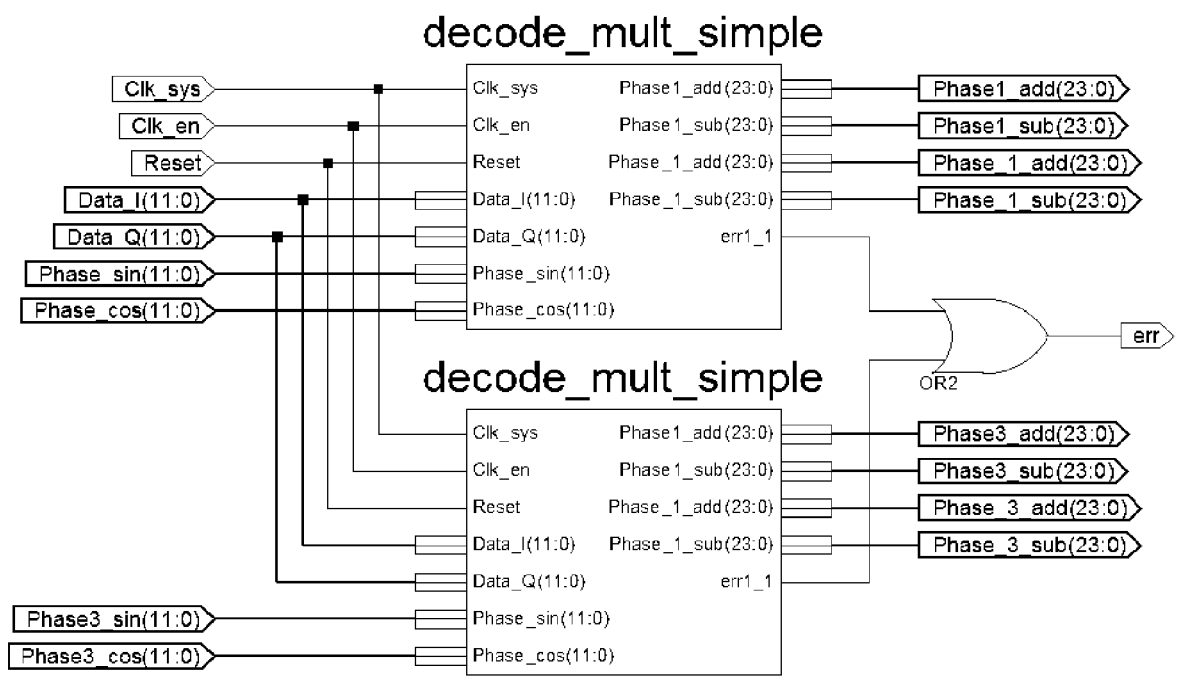
FIG. 6 is a structural diagram of FPGA of a complex multiplication module having four channels in accordance with an embodiment of the present invention.

FIG. 5 shows a structural diagram of FPGA for two-channel multiplication. The symmetry of modulation level is utilized to save about a half resource occupy amount of the multipliers. The decode_mult module is a multiplier. The bit_cut module is used to low clip the bit width of an input data so as to save the FPGA resources. The decode_add module is an adder and the decode_sub module is a substracter. Pin definition of such a module is shown in Table 4. FIG. 6 shows a four-channel multiplication operation complemented via module multiplexing. An internal structure of the decode_mult_simple module is shown in FIG. 5. Table 5 shows a exemplary pin definition.

TABLE 4

Pin Definition of the Complex Multiplication Module with Two Channels

| Signal Name | I/O | Description |
| --- | --- | --- |
| Clk_sys | IN | FPGA internal 614.4K system clock |
| Reset | IN | Reset signal |
| Clk_en | IN | Enabling clock, 38.4K |
| Phase_sin | IN | Output of sine amplitude when the modulation level is +1 |
| Phase_cos | IN | Output of cosine amplitude when the modulation level is +1 |
| Data_I | IN | Data stream input in path 1 |
| Data_Q | IN | Data stream input in path 2 |
| Pahse1_add | OUT | Output of real part of the complex multiplication when the modulation level is +1 |
| Pahse1_sub | OUT | Output of imaginary part of the complex multiplication when the modulation level is +1 |
| Phase_1_sub | OUT | Output of imaginary part of the complex multiplication when the modulation level is −1 |
| Phase_1_add | OUT | Output of real part of the complex multiplication when the modulation level is −1 |
| err1_1 | OUT | Overflow alarm of the multiplier |

TABLE 5

Pin Definition of the Complex Multiplication Module of Four Channels

| Signal Name | I/O | Description |
| --- | --- | --- |
| Clk_sys | IN | FPGA internal 614.4K system clock |
| Reset | IN | Reset signal |
| Clk_en | IN | Enable clock 38.4K |
| Phase_sin | IN | Input of sine amplitude when the modulation level is +1 |
| Phase_cos | IN | Input of cosine amplitude when the modulation level is +1 |
| Phase3_sin | IN | on |
| Phase3_cos | IN | Input of cosine amplitude when the modulation level is +3 |
| Data_I | IN | Data stream input in path I |
| Data_Q | IN | Data stream input in path Q |
| Pahse1_add | OUT | Output of real part of the complex multiplication when the modulation level is +1 |
| Pahse1_sub | OUT | Output of imaginary part of the complex multiplication when the modulation level is +1 |
| Phase_1_sub | OUT | Output of imaginary part of the complex multiplication when the modulation level is −1 |
| Phase_1_add | OUT | Output of real part of the complex multiplication when the modulation level is −1 |
| Pahse1_add | OUT | Output of real part of the complex multiplication when the modulation level is +3 |
| Pahse1_sub | OUT | Output of imaginary part of the complex multiplication when the modulation level is +3 |
| Phase_1_sub | OUT | Output of imaginary part of the complex multiplication when the modulation level is −3 |
| Phase_1_add | OUT | Output of real part of the complex multiplication when the modulation level is −3 |
| err | OUT | Overflow alarm of the multiplier |

Figure 7:
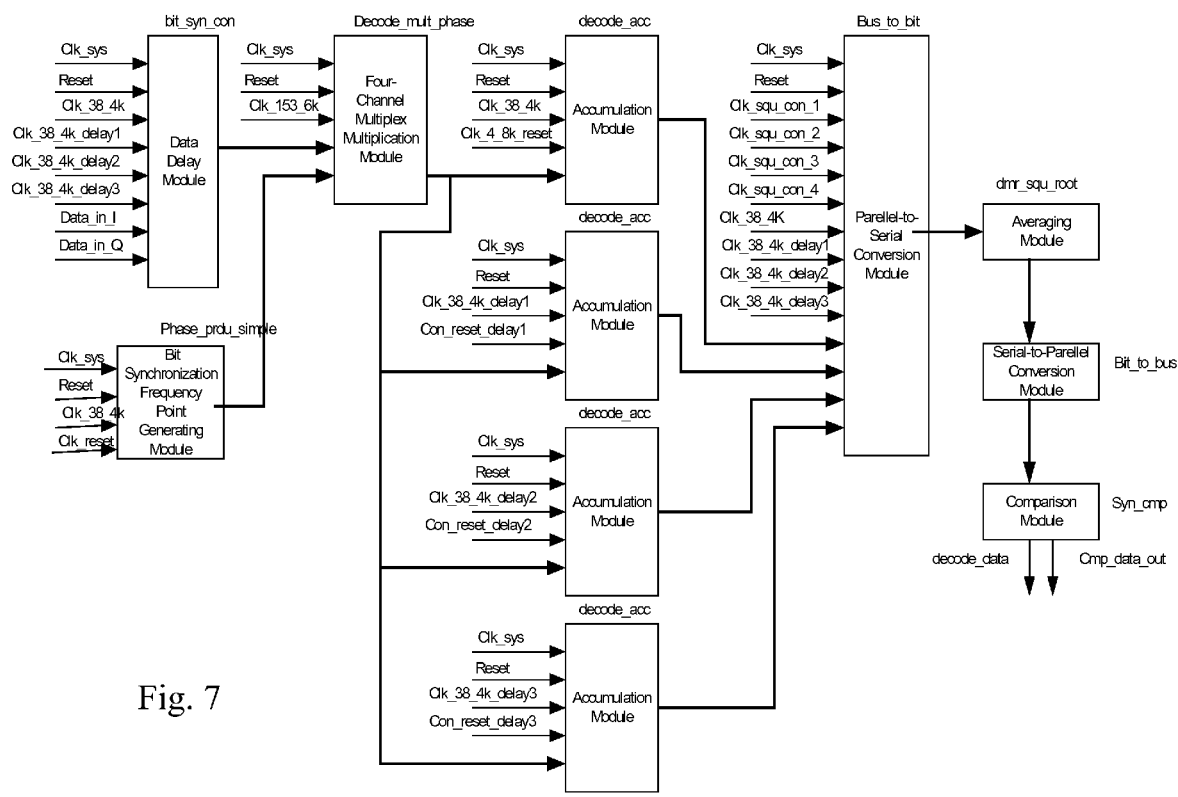
FIG. 7 is a structural diagram of FPGA of a 7-bit synchronization module in accordance with an embodiment of the present invention.

The bit synchronization structure realized by FPGA is shown in FIG. 7. The Phase_prdu_simple module is a bit synchronization frequency point generating module; the bit_syn_con module is a data delay module; the Decode_mult_phase module is a complex multiplication module with four channels; the decode_acc module is an accumulation module used to accumulate input data according to an algorithm. In FIG. 7, four accumulation modules are multiplexed respectively corresponding to the four-channel synchronization algorithm structure. The Bus_to_bit module is a parallel-to-serial conversion module. As illustrated by the structure of bit synchronizing algorithm in FIG. 1, an averaging operation should be implemented after the accumulating operation is completed within the data period, thus in order to reduce the number of multipliers that utilized to realize FPGA, the multipliers are also shared to increase data rate and save resource. The dmr_squ_root module is an averaging module; the Bit_to_bus module is a serial-parallel conversion module used for inverse operation of the Bus_to_bit module. The syn_cmp module is used to compare and choose the input data, output a correct decoded data and its corresponding maximum value. Table 6 shows for a exemplary pin definition in such a case.

TABLE 6

Pin Definition of the Bit Synchronization Module

| Signal Name | I/O | Description |
| --- | --- | --- |
| Clk_sys | IN | FPGA internal system clock |
| Reset | IN | Reset signal |
| Clk_153_6K | IN | Multiplexing control clock |
| Clk_4_8K | IN | Symbol clock |
| Clk_38_4K | IN | Symbol upsampling clock, for path 1 of bit synchronization |
| Clk_38_4k_delay1 | IN | Symbol upsampling clock, for path 2 of bit synchronization |
| Clk_38_4k_delay2 | IN | Symbol upsampling clock, for path 3 of bit synchronization |
| Clk_38_4k_delay3 | IN | Symbol upsampling clock, for path 4 of bit synchronization |
| Clk_4_8k_reset | IN | Reset clock, used to reset the accumulation module of path 1 |
| Con_reset_delay1 | IN | Reset clock, used to reset the accumulation module of path 2 |
| Con_reset_delay2 | IN | Reset clock, used to reset the accumulation module of path 3 |
| Con_reset_delay3 | IN | Reset clock, used to reset the accumulation module of path 4 |
| Clk_squ_con_1 | IN | Square enabling clock, for square calculation of path 1 at high level |
| Clk_squ_con_2 | IN | Square enabling clock, for square calculation of path 2 at high level |
| Clk_squ_con_3 | IN | Square enabling clock, for square calculation of path 3 at high level |
| Clk_squ_con_4 | IN | Square enabling clock, for square calculation of path 4 at high level |
| Data_in_I | IN | Data stream input in path I |
| Data_in_Q | IN | Data stream input in path Q |
| decode_data | OUT | Decoded output |
| Cmp_data_out | OUT | Maximum value output |

While the present invention has been described with reference to certain embodiments, it will be understood by those skilled in the art that various changes may be made and equivalents may be substituted without departing from the scope of the present invention, and the present invention will include all embodiments falling within the scope of the appended claims.

The invention claimed is:

1. A method for digitizing bit synchronization in wireless communication comprising:
   delaying at intervals an input signal sequence which contains more than one path of input signals;
   multiplying each path of input signals respectively by input signals in more than one local channel within one symbol period, the results are accumulated and then averaged within the symbol period;
   comparing absolute values of the averaged values of each channel of each path of input signals, and choosing the maximum absolute value to output as a bit synchronization extremum of the path of input signals;
   comparing the bit synchronization extremums of each path of input signals, and choosing a path of input signals having a maximum extremum as a decoded data output.

2. The method of claim 1, wherein the method further comprises splitting output of a crystal oscillator to generate several clocks necessary for the bit synchronization algorithm.

3. The method of claim 1, wherein when four paths of complex signals are utilized as input, then the interval delays of the signal sequence are set as below: the first path of said four paths of complex signals is of data stream without delay, the second path is delayed for two symbol periods, the third path is delayed for four symbol periods, and the fourth path is delayed for 6 symbol periods, thus a parallel synchronized input source is converted into a serial input source.

4. The method of claim 2, wherein when four paths of complex signals are utilized as input, then the interval delays of the signal sequence are set as below: the first path of said four paths of complex signals is of data stream without delay, the second path is delayed for two symbol periods, the third path is delayed for four symbol periods, and the fourth path is delayed for 6 symbol periods, thus a parallel synchronized input source is converted into a serial input source.

5. The method of claim 3, wherein the method further comprises the following steps of simplifying a synchronization frequency point according to symmetry of modulation level:
generating an inquiry address of sine/cosine amplitude, and read a sine/cosine amplitude value in a memory unit;
outputting the sine/cosine amplitude value in the memory unit.

6. The method of claim 4, wherein the method further comprises the following steps of simplifying a synchronization frequency point according to symmetry of modulation level:
generating an inquiry address of sine/cosine amplitude, and read a sine/cosine amplitude value in a memory unit;
outputting the sine/cosine amplitude value in the memory unit.

7. The method of claim 1, wherein the input signal sequence is in the form of complex signals, and the complex signals may be converted into a mathematical formula of multiplying path I by path Q as following:

$$e^{j(w_0+w_\theta+nw_c t)}e^{jw_c t} = (\cos(w_0 + w_\theta + nw_c t) + j\sin(w_0 + w_\theta + nw_c t))(\cos(w_c t) + j\sin(w_c t))$$
$$= \cos(w_0 + w_\theta + nw_c t)\cos(w_c t) - \sin(w_0 + w_\theta + nw_c t)\sin(w_c t) + j(\sin(w_0 + w_\theta + nw_c t)\cos(w_c t) + \cos(w_0 + w_\theta + nw_c t)\sin(w_c t))$$

wherein
$\cos(w_0+w_\theta+nw_c t)$ is data to be decoded in path I;
$\sin(w_0+w_\theta+nw_c t)$ is data to be decoded in path Q;
$e^{jw_c t}$ is output of a decoded frequency point generating module when the modulation level is +1;
wherein when the modulation level is −1, the result of the expression is:

$$\cos(w_0+w_\theta+nw_c t)\cos(w_c t)+\sin(w_0+w_\theta+nw_c t)\sin(w_c t)+j(\sin(w_0+w_\theta+nw_c t)\cos(w_c t)\cos(w_0+w_\theta+nw_c t)\sin(w_c t)).$$

8. The method of claim 5, wherein the input signal sequence is in the form of complex signals, and the complex signals may be converted into a mathematical formula of multiplying path I by path Q as following:

$$e^{j(w_0+w_\theta+nw_c t)}e^{jw_c t} = (\cos(w_0 + w_\theta + nw_c t) + j\sin(w_0 + w_\theta + nw_c t))(\cos(w_c t) + j\sin(w_c t))$$
$$= \cos(w_0 + w_\theta + nw_c t)\cos(w_c t) - \sin(w_0 + w_\theta + nw_c t)\sin(w_c t) + j(\sin(w_0 + w_\theta + nw_c t)\cos(w_c t) + \cos(w_0 + w_\theta + nw_c t)\sin(w_c t))$$

wherein
$\cos(w_0+w_\theta+nw_c t)$ is data to be decoded in path I;
$\sin(w_0+w_\theta+nw_c t)$ is data to be decoded in path Q;
$e^{jw_c t}$ is output of a decoded frequency point generating module when the modulation level is +1;
wherein when the modulation level is −1, the result of the expression is:

$$\cos(w_0+w_\theta+nw_c t)\cos(w_c t)+\sin(w_0+w_\theta+nw_c t)\sin(w_c t)+j(\sin(w_0+w_\theta+nw_c t)\cos(w_c t)\cos(w_0+w_\theta+nw_c t)\sin(w_c t)).$$

9. The method of claim 6, wherein the input signal sequence is in the form of complex signals, and the complex signals may be converted into a mathematical formula of multiplying path I by path Q as following:

$$e^{j(w_0+w_\theta+nw_c t)}e^{jw_c t} = (\cos(w_0 + w_\theta + nw_c t) + j\sin(w_0 + w_\theta + nw_c t))(\cos(w_c t) + j\sin(w_c t))$$
$$= \cos(w_0 + w_\theta + nw_c t)\cos(w_c t) - \sin(w_0 + w_\theta + nw_c t)\sin(w_c t) + j(\sin(w_0 + w_\theta + nw_c t)\cos(w_c t) + \cos(w_0 + w_\theta + nw_c t)\sin(w_c t))$$

wherein
$\cos(w_0+w_\theta+nw_c t)$ is data to be decoded in path I;
$\sin(w_0+w_\theta+nw_c t)$ is data to be decoded in path Q;
$e^{jw_c t}$ is output of a decoded frequency point generating module when the modulation level is +1;
wherein when the modulation level is −1, the result of the expression is:

$$\cos(w_0+w_\theta+nw_c t)\cos(w_c t)+\sin(w_0+w_\theta+nw_c t)\sin(w_c t)+j(\sin(w_0+w_\theta+nw_c t)\cos(w_c t)\cos(w_0+w_\theta+nw_c t)\sin(w_c t)).$$

10. The method of claim 7, wherein the step of multiplying each path of input signals respectively by input signals in more than one local channel within one symbol period further comprises:
inputting the sine/cosine amplitude value, the data streams of path I and Q into at least a multiplier, a clipper, an adder and a subtracter for calculation;
outputting the calculation result as a real part and a false part of the complex multiplication of the modulation level.

11. The method of claim 8, wherein the step of multiplying each path of input signals respectively by input signals in more than one local channel within one symbol period further comprises:
inputting the sine/cosine amplitude value, the data streams of path I and Q into at least a multiplier, a clipper, an adder and a subtracter for calculation;
outputting the calculation result as a real part and a false part of the complex multiplication of the modulation level.

12. The method of claim 9, wherein the step of multiplying each path of input signals respectively by input signals in more than one local channel within one symbol period further comprises:
   inputting the sine/cosine amplitude value, the data streams of path I and Q into at least a multiplier, a clipper, an adder and a subtracter for calculation;
   outputting the calculation result as a real part and a false part of the complex multiplication of the modulation level.

13. A system for digitizing bit synchronization in wireless communication is provided, the system contains:
   a clock control module used to split output of a crystal oscillator to generate several clocks necessary for a bit synchronization algorithm;
   a data delay module used to delay input data;
   a bit synchronization frequency point generating module used to simplify a synchronization frequency point according to symmetry of modulation level;
   a complex multiplication module used to multiply an input complex signal by simplified synchronization frequency point from the bit synchronization frequency generating module;
   an accumulation module used to accumulate the multiplied data within a data period;
   an averaging module used to average the accumulated data;
   a selection module used to compare and choose the averaged data and output a decoded data and its corresponding maximum value.

14. The system of claim 13, wherein the system further comprises:
   a parallel-to-serial conversion module used to convert a parallel synchronized input source that needs to be averaged into a serial input source;
   a serial-to-parallel conversion module used to convert the averaged serial synchronized input source into a parallel input source and input the parallel input source into the selection module for comparison.

15. The system of claim 13, wherein the bit synchronization frequency point module further comprises:
   a generating module used to generate an inquiry address of sine/cosine amplitude and read the sine/cosine amplitude value in a memory unit;
   wherein the memory unit is used to store and output a sine/cosine amplitude value.

16. The system of claim 14, wherein the bit synchronization frequency point module further comprises:
   a generating module used to generate an inquiry address of sine/cosine amplitude and read the sine/cosine amplitude value in a memory unit;
   wherein the memory unit is used to store and output a sine/cosine amplitude value.

17. The system of claim 13, wherein the complex multiplication module further comprises at least a multiplier, a clipper used to low clip the bit width of input data, an adder and a subtracter.

18. The system of claim 14, wherein the complex multiplication module further comprises at least a multiplier, a clipper used to low clip the bit width of input data, an adder and a subtracter.

* * * * *